Figures 7, 8:
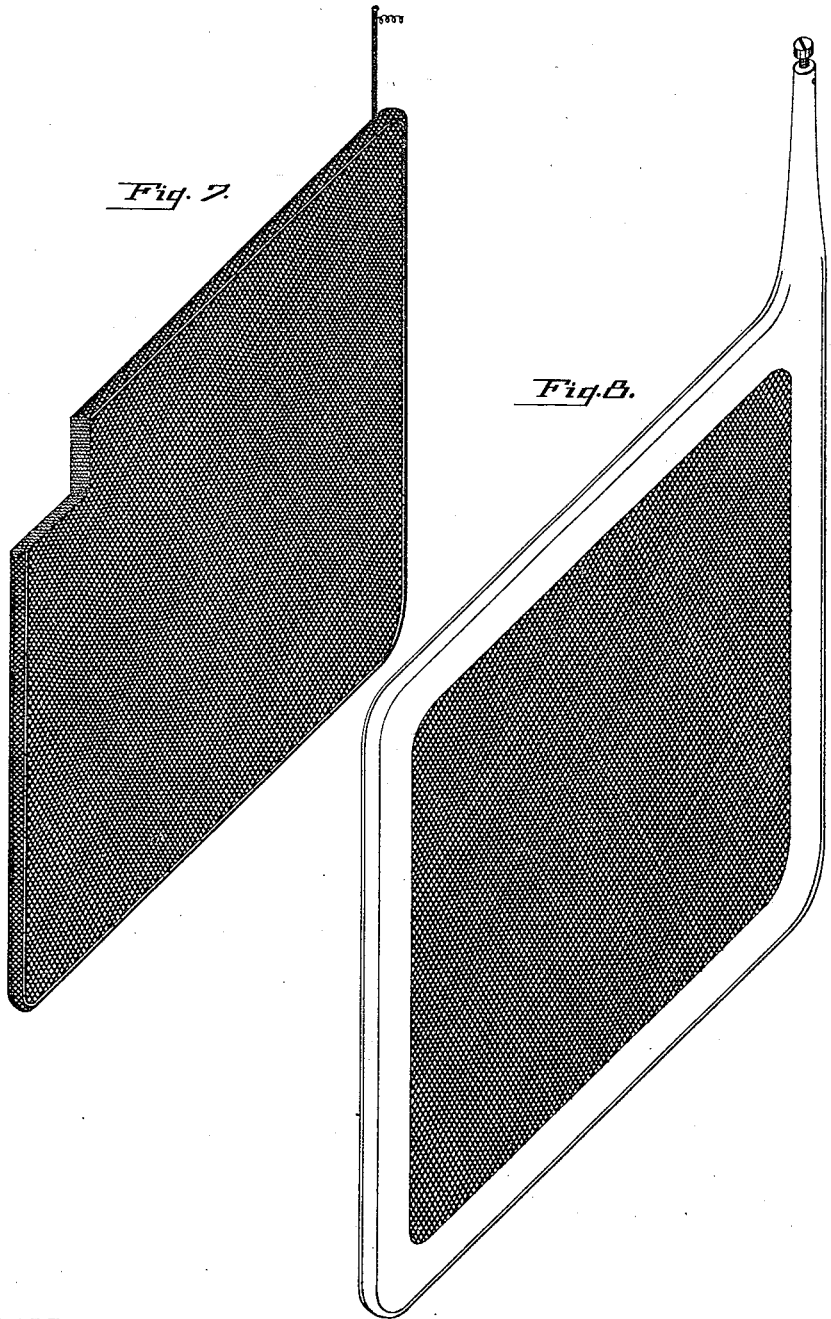

(No Model.) 4 Sheets—Sheet 1.
C. PAYEN.
PROCESS OF PRODUCING POROUS CRYSTALLIZED METAL PLATES.
No. 440,275. Patented Nov. 11, 1890.
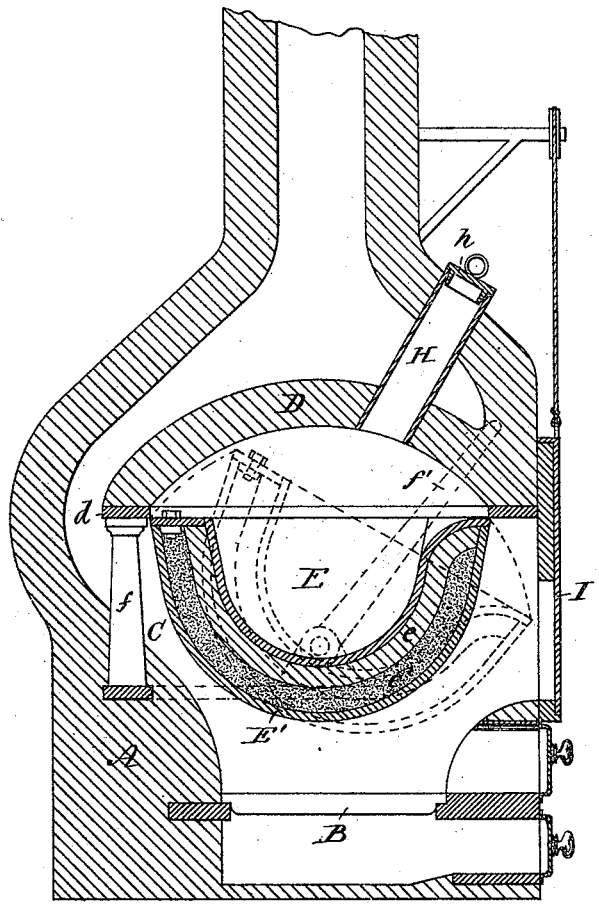
WITNESSES:
INVENTOR:

(No Model.) 4 Sheets—Sheet 2.
C. PAYEN.
PROCESS OF PRODUCING POROUS CRYSTALLIZED METAL PLATES.
No. 440,275. Patented Nov. 11, 1890.
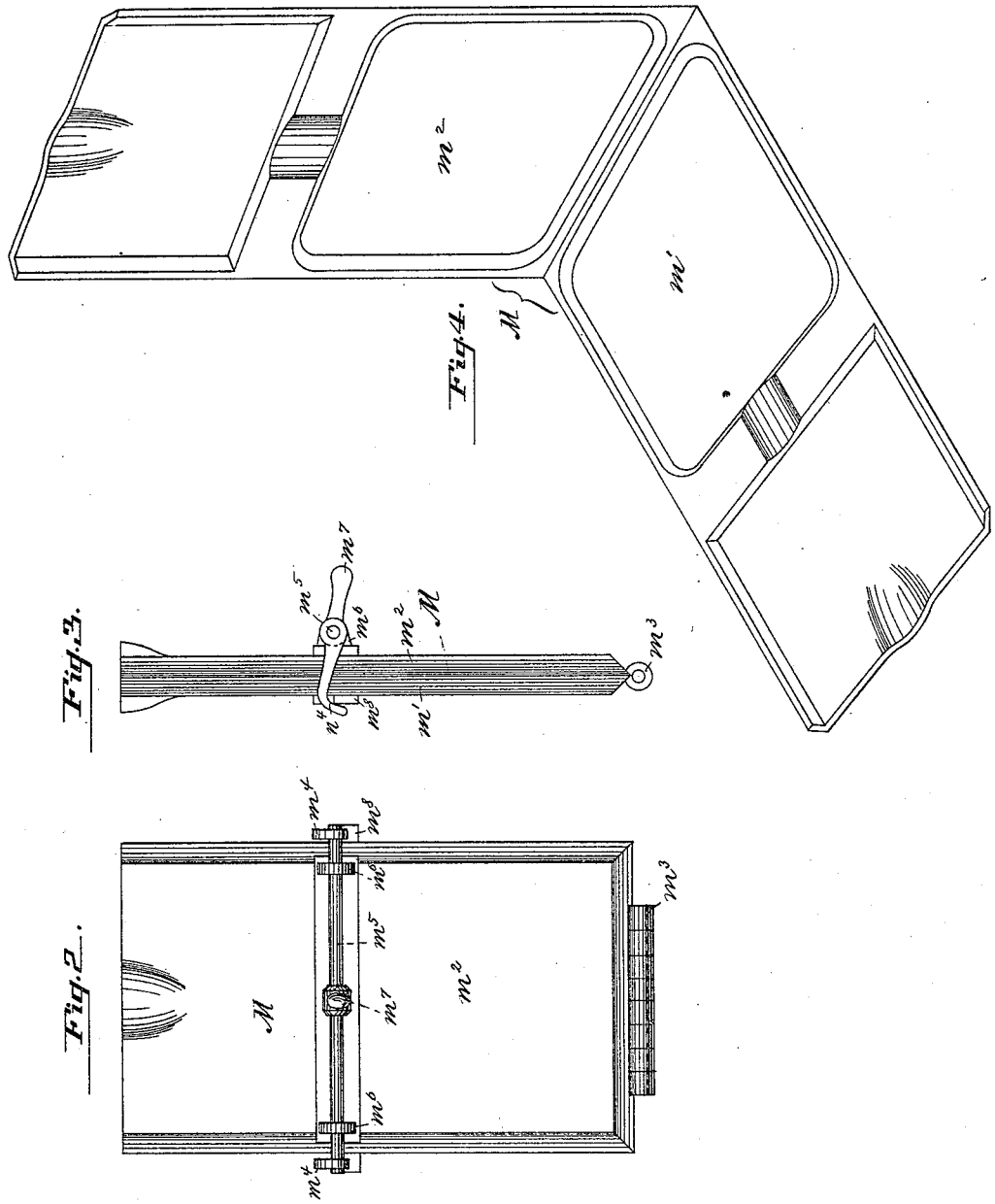

(No Model.) 4 Sheets—Sheet 3.
C. PAYEN.
PROCESS OF PRODUCING POROUS CRYSTALLIZED METAL PLATES.
No. 440,275. Patented Nov. 11, 1890.
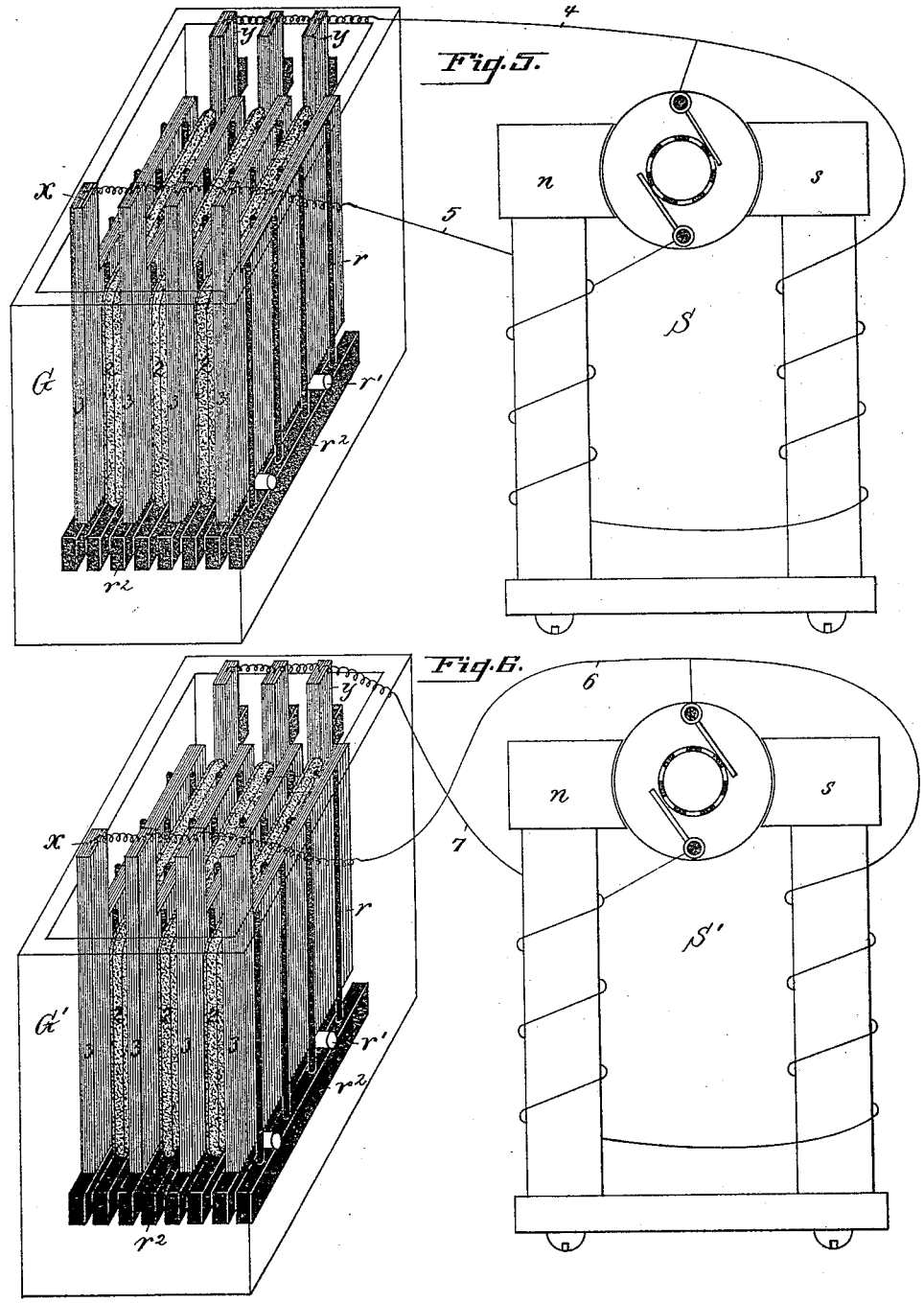
WITNESSES:
Hermann Bormann
Thomas M. Smith
INVENTOR:
Clement Payen,
By J. Walter Douglass
Atty.

(No Model.) 4 Sheets—Sheet 4.
C. PAYEN.
PROCESS OF PRODUCING POROUS CRYSTALLIZED METAL PLATES.

No. 440,275. Patented Nov. 11, 1890.

WITNESSES:
Hermann Bormann
Thomas M. Smith

INVENTOR:
Clement Payen,
By J. Walter Douglass,
Atty.

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

PROCESS OF PRODUCING POROUS CRYSTALLIZED METAL PLATES.

SPECIFICATION forming part of Letters Patent No. 440,275, dated November 11, 1890.

Application filed June 18, 1888. Serial No. 277,489. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Process of Producing Porous Crystallized Metal Plates, of which the following is a specification.

My invention has relation to the manufacture of the plates or elements of a secondary or storage battery.

The principal object of my invention is to provide a strong porous crystallized metal plate or element.

My invention consists, essentially, in fusing two or more metallic salts with an oxide or oxides of a metal or metals, then pouring the mass into a mold to assume a crystallized form, and then reducing the structure to a metallic state and eliminating foreign matter therefrom, so as to leave the product or plate in a pure porous crystallized metallic state to adapt the same for use as an element of a battery.

In the accompanying drawings is illustrated an apparatus for the conduct of the method of producing a porous crystallized metal plate according to my invention, and in which—

Figure 1 is a vertical central section through a furnace, showing the crucible pivotally supported therein. Fig. 2 is a top or plan view of a mold. Fig. 3 is an end view thereof. Fig. 4 is a perspective view of said mold, showing the interior formation thereof. Figs. 5 and 6 are respectively diagrammatic views of a double electrolysis, being one of the methods of reducing said plates to a metallic state and eliminating foreign matter from the metal required; and Figs. 7 and 8 are views in perspective of porous crystallized metal plates made according to my invention, with and without supporting-frames, and showing, also, the internal formation thereof.

Referring to the drawings, A is a furnace, and B the grate supported in the lower part thereof.

C is the draft-flue.

D is an arch in the upper part of the furnace, supported by a ring $d$, held in position by columns $f$, arranged and supported in any suitable manner.

E is a crucible open at the top, and around which is formed a layer of amianthus, asbestus, or other material, forming a capsule $e$, and between the capsule $e$ and the metal-pot E' is a layer of sand $e'$. The metal-pot E', pivotally supported within the furnace, is operated from the outside by a lever $f'$, attached to one of the journals of the metal-pot E', whereby the crucible may be readily tilted for discharging its contents into a receptacle for further treatment.

H is an inclined hopper provided with a removable stopper $h$ for charging the material into the crucible.

I is a door operated to allow of the discharge of the mass from the crucible into a mold for causing the same in cooling to assume a crystallized form.

The method of producing a porous crystallized metal plate according to my invention to form an element of a battery may be carried out in the following manner: To a charge composed of the chlorides of lead and zinc is added from two (2) to ten (10) per cent., by weight, more or less, of biborate of lead or biborate of zinc, or both of said substances or materials may be added to said salts in the above-mentioned proportions, and when sufficient fluidity has been obtained by the fusion of the mass it is discharged into a mold to cool and crystallize. When cool or perfectly cold, the structure is removed into another mold if a frame is to be formed around the same; or if not to be framed the cast structure may be reduced to a metallic state for use by subjecting the same to electrolytic or chemical action, or both, in a manner to be hereinafter fully described. Again, to a charge composed of the salts or chlorides of lead, zinc, and cadmium may be added litharge, massicot, or minium in the proportion of from two (2) to ten (10) per cent., by weight, more or less, and the combined mass or mixture, after sufficient fluidity has been obtained, without permitting of ebullition or bubbling of the mass, poured into a mold to cool and assume a crystallized form when the cast plate or other structure is reduced by electrolytic or chemical action to a metallic state to form an element of an electric battery.

In the practice of the invention it is important that the cast structures should be produced free from rupture or any tendency to readily break in handling, both before and after their reduction to a metallic state for use. The mass having been fused as described is then discharged into a mold M, having a perfectly smooth interior surface.

Molds made of malleable or cast iron become useless in a short time, owing to adherence of salts in use to the sides thereof. The same objection applies with equal force to the use of those made of porcelain; but molds made of lead with the exercise of care give good results. The material to which preference is given for the formation of the mold is either brass or bronze. The mold may be made in two parts $m'$ and $m^2$, chamfered, as shown in Fig. 4, and the parts hinged at $m^3$ and clamped together by means of catches $m^4$, mounted on the extremities of a rod $m^5$, held in bearings $m^6$, formed with one of the parts and operated by a lever $m^7$, as shown in Figs. 2 and 3, the catches $m^4$ being caused to engage with a strip $m^8$ on the opposite part of the mold M by means of the lever $m^7$. This mold may be constructed so that the two parts will be of either equal or unequal thicknesses of metal, according to the materials, to assume a solid form therein.

In pouring the fused mass into a mold having the two parts of equal thicknesses of metal such mass will commence to cool from each side, and the crystals composing said mass will meet or unite with each other at their summits, sides, or facets uniformly throughout the plate from each side of the mold at the median line of the structure. The meeting, however, of the crystals at either their summits, sides, or facets in the structure will depend in a measure upon the rapidity with which the crystallization takes place in the cooling of the fused mass in said mold, When a mold is used having the two parts or sides of unequal thicknesses of metal, the fused mass charged into the mold will cool therein unequally, thereby causing the crystals to assume a fixed position in the structure faster from the side of the mold having the greater thickness of metal than those assuming a fixed position in the plate from the opposite side of the mold of a less thickness of metal beyond the median line of the plate or other structure. In a few minutes after the fluid mass has been poured into the mold M it should assume a crystallized form. The crystallized plate when cool is removed from the mold for having a frame composed of lead and mercury or lead and antimony, or other suitable material or materials cast around the same, with a terminal forming a conductor; or instead of a frame being cast around the plate a platinum or other suitable wire may be inserted directly into the plate to form a conductor. A series of crystallized plates treated in the above manner is now placed in a vase G, containing water and sulphuric acid in the proportion of ten (10) per cent., more or less. These crystallized plates 2, immersed in the solution in the vase G, are alternated with plates of equal dimensions composed of lead or artificial charcoal 3, each having a terminal $x$. All of the crystallized plates 2 are connected through their terminals $y$ with a wire 4, while the lead or charcoal plates 3 are connected through their terminals $x$ with a wire 5. The two systems of plates are insulated from each other by means of insulating-rods $r$, and from the vase G by means of the insulators $r'$, mounted on the horizontal rods $r^2$, in the bottom of the vase G, as shown in Fig. 5, the system of crystallized plates being connected with the negative electrode $s$ of the dynamo S, while the system of lead or charcoal plates is connected with the positive electrode $n$ of the dynamo S, and the electrolytic action permitted to take place. The crystallized plates thus treated are then removed and immersed in another vase G', containing water and sulphuric acid in about the same proportions as hereinabove mentioned. In this second receptacle G' the crystallized plates are again alternated with others of ordinary lead or artificial charcoal, as in the previous instance, and the two systems of plates, insulated, respectively, from each other and the vase G', are again connected by two separate wires 6 and 7 with the positive and negative electrodes $n$ and $s$ of a dynamo S', as in the first instance mentioned, with this exception, that the negative electrode $s$ is connected with the system of lead or charcoal plates through the terminals $x$, while the positive electrode $n$ is connected with the system of crystallized plates through the terminals $y$, as shown in Fig. 6. By the second electrolytic action which takes place the salts in a metallic state other than the metal required will be eliminated, thereby leaving the plates in a porous metallic state for use after proper washing and drying in any preferred manner.

Still another method of reducing by chemical action the crystallized plates to a metallic state may be resorted to and carried out in the following manner: In a vase containing a suitable solution, preferably dilute sal-ammoniac in the proportion of five (5) to ten (10) per cent., more or less, a series of crystallized plates is arranged alternately in contact with a series of metallic zinc plates of equal dimensions. If a series of the crystallized plates be arranged in contact with a series of metallic zinc plates in a solution of sal-ammoniac and water in a vase for from twelve to fifteen hours, more or less, the effect produced upon them by the chemical action taking place will be to reduce the same to a porous metallic state or condition for use. The porous crystallized metal plates treated, as above described, by electrolytic or chemical action, or both, may then be removed from the vase and washed and dried by a gentle heat, whereby the plates will be brought to a chemically pure porous crystallized metal state, as illustrated in Figs. 7 and 8, for use as the plates or elements of a secondary or storage battery.

Having thus described the nature and objects of my invention, what I claim as new, and desire to secure by Letters Patent, is—

1. The method of producing a porous crystallized metal plate, &c., which consists in subjecting two or more metallic salts and an oxide or oxides of a metal or metals to fusion, then pouring the mass into a mold to cool and assume a crystallized form, and then reducing the structure to a metallic state, substantially as described.

2. The method of producing a porous crystallized metal plate, &c., which consists in subjecting two or more metallic salts and an oxide or oxides to fusion, then pouring the mass into a mold and allowing it to cool and crystallize, and then reducing electrolytically the structure to a metallic state, substantially as described.

In witness whereof I have hereunto set my signature in the presence of two subscribing witnesses.

CLÉMENT PAYEN.

Witnesses:
GEO. W. REED,
THOMAS M. SMITH.